(12) United States Patent
Cheng et al.

(10) Patent No.: US 8,340,221 B1
(45) Date of Patent: Dec. 25, 2012

(54) SYSTEM AND METHOD FOR FREQUENCY OFFSET AND SYMBOL INDEX ESTIMATION

(75) Inventors: Hao-ren Cheng, Miaoli County (TW); Chih-yuan Chu, Hsinchu (TW); Justin Huang, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 12/609,294

(22) Filed: Oct. 30, 2009

(51) Int. Cl.
*H03K 9/00* (2006.01)
(52) U.S. Cl. ........................................ 375/316; 375/346
(58) Field of Classification Search .................... 375/316
See application file for complete search history.

(56) References Cited

U.S. PATENT DOCUMENTS

| | | | |
|---|---|---|---|
| 2002/0003773 A1* | 1/2002 | Okada et al. | 370/208 |
| 2003/0223477 A1* | 12/2003 | Loomis et al. | 375/147 |
| 2005/0169408 A1* | 8/2005 | Kim | 375/343 |
| 2006/0018413 A1* | 1/2006 | Gupta | 375/343 |

* cited by examiner

*Primary Examiner* — Shuwang Liu
*Assistant Examiner* — Michael Neff
(74) *Attorney, Agent, or Firm* — Bay Area Technology Law Group PC

(57) ABSTRACT

Scattered pilots are used to estimate the integer frequency offset and OFDM symbol index simultaneously. A cross-correlation between IFFT outputs of received samples with different spectral shift and OFDM symbol index is used to identify the channel impulse response. Upon determination of the channel impulse, the estimated integer frequency offset and OFDM symbol index can then be determined.

20 Claims, 3 Drawing Sheets

SYSTEM AND METHOD FOR FREQUENCY OFFSET AND SYMBOL INDEX ESTIMATION

FIELD OF THE PRESENT INVENTION

The present invention relates to multiple carrier wireless communication systems in general, and more specifically, to the use of cross-correlation to determine integer frequency offset in wireless OFDM systems to improve performance.

BACKGROUND OF THE INVENTION

Advanced multimedia services continue to drive requirements for increasing data rates and higher performance in wireless systems Current technologies for high performance communication systems, such as those specified by the European terrestrial digital video broadcasting (DVB-T) standard, the Japanese integrated services digital broadcasting terrestrial standard (ISDB-T) and the digital audio broadcasting (DAB) standard, employ communication methods based on Orthogonal Frequency Division Multiplexing (OFDM)

In OFDM multiple sub-carrier systems, a higher rate data signal is divided among multiple narrowband sub-carriers that are orthogonal to one another in the frequency domain. Two signals are orthogonal if their dot product is equal to zero. Thus, the higher rate data signal is transmitted as a set of parallel lower rate data signals carried on separate sub-carriers A received OFDM symbol in an OFDM system generally consists of both data and pilot synchronization information transmitted on the multiple sub-carriers multiplexed together and spanning multiple sample periods Modulation and demodulation in an OFDM system uses an inverse fast Fourier transform (IFFT) at the transmitter and a fast Fourier transform (FFT) at the receiver At the transmitter, a cyclic prefix of a section of the IFFT output for each OFDM symbol is typically appended to the beginning of the OFDM symbol as a guard interval (GI) The length of the OFDM symbol before adding the guard interval is known as the useful symbol period duration. At the receiver, the cyclic prefix is removed prior to the FFT demodulation by the appropriate positioning of an FFT window, which has a size equal to the useful symbol period duration, along a received sample sequence. Subsequently, FFT demodulation transforms the window of received time domain samples, in the received sample sequence, to a frequency domain (OFDM) symbol.

As known to those of skill in the art, OFDM systems can be very sensitive to frequency offsets caused by the mismatch of oscillators in the transmitter and receiver. Another significant source of frequency offset in mobile systems results from the Doppler shift the channel frequency due to the relative motion between the transmitter and receiver Frequency offset can be divided into an integer portion and a fractional portion as follows:

$$\Delta f = \Delta f_I + \Delta f_F \quad (1)$$

The integer portion corresponds to an integral multiple of the sub-carrier spacing that can be represented as:

$$(2) \quad \Delta f_I = n_I \cdot \frac{1}{T_u}$$

where $\Delta f_I$ is the integer frequency offset, $n_I$ is the integral multiple and $$\frac{1}{T_u}$$

is the sub-carrier spacing. Similarly, the fractional portion corresponds to a fractional multiple of the sub-carrier spacing that can be represented as:

$$\Delta f_F = \Delta f'_F \cdot \frac{1}{T_u} \quad (3)$$

where $\Delta f_F$ is the fractional frequency offset and $\Delta f'_F$ is the fractional multiple The fractional frequency offset destroys orthogonality among sub-carriers, resulting in inter-carrier interference (ICI). While the integer frequency offset does not affect orthogonality, it does cause a circular shift and phase rotation of the received symbols, resulting in a 0.5 bit error rate. Accordingly, the performance of OFDM systems can be improved by using techniques to estimate and compensate for the integer frequency offset.

An example of the basic detection functions of an OFDM receiver is shown in FIG. 1. Conventionally, blocks 101-106 and 108-110 comprise the inner receiver. As will be appreciated, an incoming signal is subject to analog to digital conversion and filtering in block 101 Integer and fractional frequency offset corrections are applied in block 102. Next, the signal is interpolated and decimated in block 103. The GI is removed from the OFDM symbols in block 104 and then the FFT is applied in block 105. Finally, the transformed symbols are equalized and channel estimation is performed in block 106 before the signal is fed to the outer receiver, block 107. Generally, post-FFT estimation routines are performed in block 108 using the output from FFT block 105. The post-FFT routines include determination of the integer portion of the frequency offset, sampling clock estimations and symbol timing estimations. The post-FFT estimations can then be applied to blocks 102, 103 and 104 during reception of subsequent symbols. Transmission mode detection occurs in block 109, typically using autocorrelation of the output of block 103 to determine the transmission mode and GI. Finally, pre-FFT estimation routines are performed in block 110 using the output from block 103 and 109. Preferably, pre-FFT estimations include determination of symbol timing and determination of the fractional portion of the frequency offset One conventional means of performing the pre-FFT estimation in block 110 involves an autocorrelation routine such as shown in FIG. 2. As one of skill in the art will appreciate, the GI comprises a cyclic prefix such that the set I' contains the indices of the data samples that are copied to the cyclic prefix and the set I contains the indices of the prefix. Accordingly, the samples in the cyclic prefix and their copies r(t), t∈I∪I' can be pairwise correlated so that:

$$E\{r(t) \cdot r^*(t+N)\} = \begin{cases} E\{|s(t)|^2\} \cdot e^{-j2\pi \cdot \Delta f'_F} & t \in I \\ 0 & \text{otherwise} \end{cases} \quad (4)$$

where $r(t) = s(t-\theta) \cdot e^{j2\pi \Delta f'_F \cdot t/N} + n(t)$ is received signal and $\theta$ is the unknown arrival time of a symbol.

Accordingly, correlation over a window length L between two received signal block, spaced by N samples, can be estimated using a maximum likelihood (ML) method. Specifically, the symbol timing, $\hat{\theta}$, and fractional portion of the frequency offset, $\Delta\hat{f}'_F$, can be estimated by the following equations:

$$\hat{\theta} = \arg\max_{\gamma}\left\{\left|\sum_{t=\gamma}^{\gamma+L-1} r(t)\cdot r^*(t+N)\right| - \rho\cdot\left(\frac{1}{2}\sum_{t=\gamma}^{\gamma+L-1}|r(t)|^2 + |r(t+N)|^2\right)\right\} \quad (5)$$

$$\Delta\hat{f}'_F = -\frac{1}{2\pi}\angle\left(\sum_{t=\hat{\theta}}^{\hat{\theta}+L-1} r(t)\cdot r^*(t+N)\right) \quad (6)$$

where the correlation coefficient is $$\rho = \frac{SNR}{SNR+1}$$

Further details of this method are described in van de Beek, et al, *ML Estimation of Time and Frequency Offset in OFDM Systems, IEEE Transactions On Signal Processing*, 45:7 (July 1997), which is hereby incorporated by reference in its entirety.

Following the pre-FFT estimation routines in block 110, the residual fractional portion of the frequency offset is relatively small. In turn, the post-FFT estimation occurring in block 108 using these values has relatively little ICI noise The effect of these routines means that the k'th transmitted subcarrier arrives at the FFT output bin with an index of $k=k'+n_I$.

Conventionally, the spectral shift is determined next. Since $n_1 = \Delta f_1 \cdot T_u$, the symbol demodulated by the FFT routine, corresponding to the Ith OFDM symbol on the subcarrier k, can be represented represented as:

$$Z_{l,k} = a_{l,k'}H_{l,k'}\cdot e^{j2\pi((l(N+L)+L)/N)n_I} + n_{l,k} \quad (7)$$

where $a_{l,k'}$ is the transmitted symbol at subcarrier k' and OFDM symbol I and $H_{l,k'}$ is the channel transfer function at subcarrier frequency k'.

In OFDM systems employing continuous pilots (CP), the spectral shift $n_I$ can be detected using the CPs $c_{k'}$ at specified subcarrier positions $k' \in C$. For example, in the DVB-T standard, the transmitted CPs are boosted in power by factor $\beta^2$ and modulated using time-invariant symbols. Using the techniques described above, correlating FFT output symbols of two consecutive OFDM symbols I-1 and I, and assuming that $H_{l,k} \approx H_{l-1,k}$, leads to the following equation:

$$x_k = z_{l,k}\cdot z^*_{l-1,k} = \quad (8)$$
$$e^{j2\pi((N+L)/N)n_I}\cdot|H_k|^2\cdot\begin{cases}\beta^2 & k \in C+n_I \\ a_{l,k'}\cdot a^*_{l-1,k'} & k \in B+n_I \\ 0 & \text{otherwise}\end{cases} + \text{noise}$$

where B is the set of transmitted non-CP samples, for example transmission parameter signaling (TPS), scattered pilots (SP), and data, appearing at random. Accordingly, the estimated spectral shift $\hat{n}_I$ is $$\hat{n}_I = \arg\max_{m\in\Gamma}\left|\sum_{k\in C+m} x_k\right| \forall m \in \Gamma \quad (9)$$

where $\Gamma$ is the search range given by $\lfloor -n_{I,max}, n_{I,max}\rfloor$. Further, the integer frequency offset can also be estimated as $$\Delta\hat{f}_I = \hat{n}_I\cdot\frac{1}{T_u}.$$

Similar conventional techniques can be used to estimate the integer portion of the frequency offset in OFDM symbols that employ scattered pilots as well. As will be recognized, FIG. 3 depicts the frame structure of a DVB-T system that uses scattered pilots This frame structure is also similar to that employed by ISDB-T systems In the embodiment shown, the scattered pilot values are transmitted at a rate of every 12 sub-carrier frequencies. When the OFDM symbol index $p=\text{mod}(1,4)$ is unknown, four possible SP patterns $\{S_0, S_1, S_2, S_3\}$ exist, as shown in FIG. 3. Because the SP patterns repeat every four OFDM symbols, the autocorrelation at the FFT output of samples from OFDM symbols I-4 and I assuming $H_{l,k} \approx H_{l-4,k}$ is given as $$x_k = z_{l,k}\cdot z^*_{l-4,k} = \quad (10)$$
$$e^{j2\pi(4(N+L)/N)\cdot n_I}\cdot|H_{k'}|^2\cdot\begin{cases}\beta^2 & k \in S_{mod(l,4)}+n_I \\ a_{l,k'}\cdot a^*_{l-4,k'} & k \in H+n_I \\ 0 & \text{otherwise}\end{cases} + \text{noise}$$

where $\hat{p}$ is the estimated symbol index $\hat{p}\in\{0,1,2,3\}$, $S_{mod(l,4)}$ is the set of SP transmitted at symbol I, and H is the set of transmitted non-SP samples, for example, TPS, CP and data. For example, as shown in FIG. 3, autocorrelation can be performed between SP values 301 and 302.

As one of skill in the art will recognize, these prior art methods for determining the integer portion of the frequency offset and symbol timing suffer from certain drawbacks. In schemes employing continuous pilots, the pilots occupy a significant fraction of the signal, limiting the efficiency of the system. For example, there are 177 CPs in the 8K mode and 45 CPs in the 2K mode in conventional DVB-T systems. Accordingly, the pilots consume a significant portion of the overall signal and therefore it would be desirable to employ systems that do not require CPs.

The prior art methods also suffer limitations in systems using scattered pilots, such as one-segment ISDB-T. As discussed above, determination of the integer frequency offset requires the assumption that $H_{l,k}\approx H_{l-4,k}$ so that the autocorrelation determination can be made. However, when the channel is time varying, then $H_{l,k}\ne H_{l-4,k'}$ preventing use of the methods discussed above. Moreover, even if the channel is not time varying, interference between the sub-carriers can interfere with autocorrelation, also preventing the use of these prior art methods.

Accordingly, it would be desirable to provide systems and methods that allow determination of the integer frequency offset and symbol timing without autocorrelation. It would also be desirable to provide systems and methods for determining the integer frequency offset and symbol timing without requiring continuous pilots. Finally, it would be desirable to provide such systems and methods that optimize the efficiency of an OFDM system and offer improved performance in mobile applications.

SUMMARY OF THE INVENTION

In accordance with the above needs and those that will be mentioned and will become apparent below, this disclosure is directed to a method for determining frequency offset in a multiple sub-carrier digital communication receiver includes the steps of receiving a plurality of modulated symbols over a channel having a channel impulse response, demodulating received symbols, depolarizing the demodulated symbols, correlating an inverse Fourier transform of the depolarized symbols with the channel impulse response, and determining an integer portion of the frequency offset from the correlation of the inverse Fourier transform of the depolarized symbols with the channel response. Preferably, the method also includes the step of determining a symbol index of the received symbols from the correlation of the inverse Fourier transform output with the channel response.

In one aspect, the plurality of modulated symbols comprises scattered pilot values. Preferably, the step of depolarizing the demodulated symbols comprises depolarizing the symbols by a pattern corresponding to the scattered pilot values Also preferably, correlating the inverse Fourier transform with the channel impulse response comprises performing the inverse Fourier transform on the depolarized symbols at a set of symbol indices corresponding to possible scattered pilot patterns. In one embodiment, the scattered pilot values are transmitted every twelfth sub-carrier and wherein the variety of possible scattered pilot patterns comprises four patterns.

In another aspect, the step of correlating the inverse Fourier transform with the channel impulse response can include performing the inverse Fourier transform on the depolarized symbols at a set of possible spectral shifts.

Further, the methods can include the step of accumulating the inverse Fourier transform of the depolarized symbols at a first frequency of received symbols. Preferably, the first frequency of received symbols does not equal a frequency at which the scattered pilots repeat. In one embodiment, the first frequency of received symbols comprises every five symbols and wherein the scattered pilots are spaced every twelfth sub-carrier and repeat every four symbols.

This disclosure is also directed to an apparatus in a multiple sub-carrier digital communication receiver for determining a frequency offset of a symbol transmitted over a channel having a channel impulse response that includes a demodulating block to demodulate the received symbols, a depolarizing block configured to depolarize the demodulated symbols and a correlation block configured to correlate an inverse transform of the depolarized symbols with the channel impulse response, wherein the apparatus is configured to determine an integer portion of the frequency offset from the correlation of the inverse Fourier transform of the depolarized symbols with the channel response. Preferably, the apparatus can also determine a symbol index of the received symbols from the correlation of the inverse Fourier transform output with the channel response.

In one aspect, the plurality of modulated symbols comprises scattered pilot values. In such embodiments, the depolarizing block is configured to depolarize the demodulated symbols by a pattern corresponding to the scattered pilot values. Also preferably, the correlating block is configured to perform the inverse Fourier transform on the depolarized symbols at a set of symbol indices corresponding to possible scattered pilot patterns. In one embodiment, the scattered pilot values are transmitted every twelfth sub-carrier and wherein the variety of possible scattered pilot patterns comprises four patterns. In another aspect, the correlating block is further configured to perform the inverse Fourier transform on the depolarized symbols at a set of possible spectral shifts.

Further, the apparatus can be configured to accumulate the inverse Fourier transform of the depolarized symbols at a first frequency of received symbols. Preferably, the first frequency of received symbols does not equal a frequency at which the scattered pilots repeat. In one embodiment, the first frequency of received symbols comprises every five symbols and wherein the scattered pilots are spaced every twelfth sub-carrier and repeat every four symbols.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

As discussed above, scattered pilots are used to estimate the integer frequency offset. Further, the OFDM symbol index can be determined simultaneously. A cross-correlation between IFFT outputs of received samples with different spectral shift and OFDM symbol index is used to identify the channel impulse response. The estimated integer frequency offset and OFDM symbol index are the values that maximize the correlation of the IFFT output with the channel impulse response As will be recognized, this method also applies to no signal conditions. When the channel impulse response cannot be found, this indicates that no signal is being transmitted.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Details regarding OFDM systems can be found in co-pending, commonly-assigned U.S. patent application Ser. No. 12/272,629, filed Nov. 17, 2008, Ser. No. 12/277,247, filed Nov. 24, 2008, Ser. No. 12/277,258, filed Nov. 24, 2008, Ser. No. 12/365,726, filed Feb. 4, 2009, Ser. No. 12/398,952, filed Mar. 5, 2009, 12/512,273, filed Jul. 30, 2009 and Ser. No. 12/496,040, filed Jul. 1, 2009 all of which are hereby incorporated by reference in their entirety.

Further, all other publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

Figure 1:
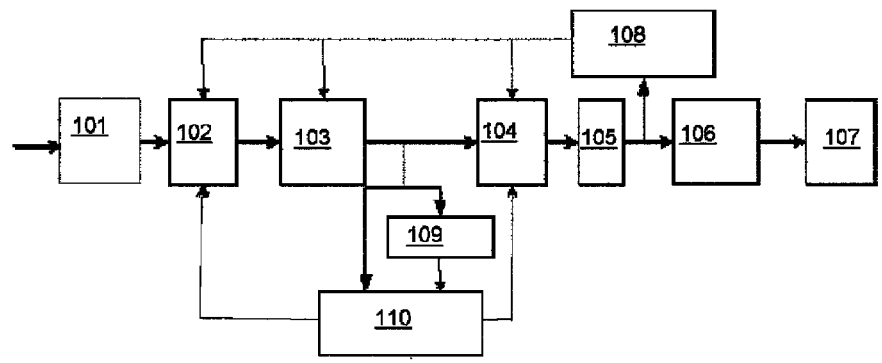
FIG. 1 is a schematic illustration of functional aspects of an OFDM receiver.
Figure 2:
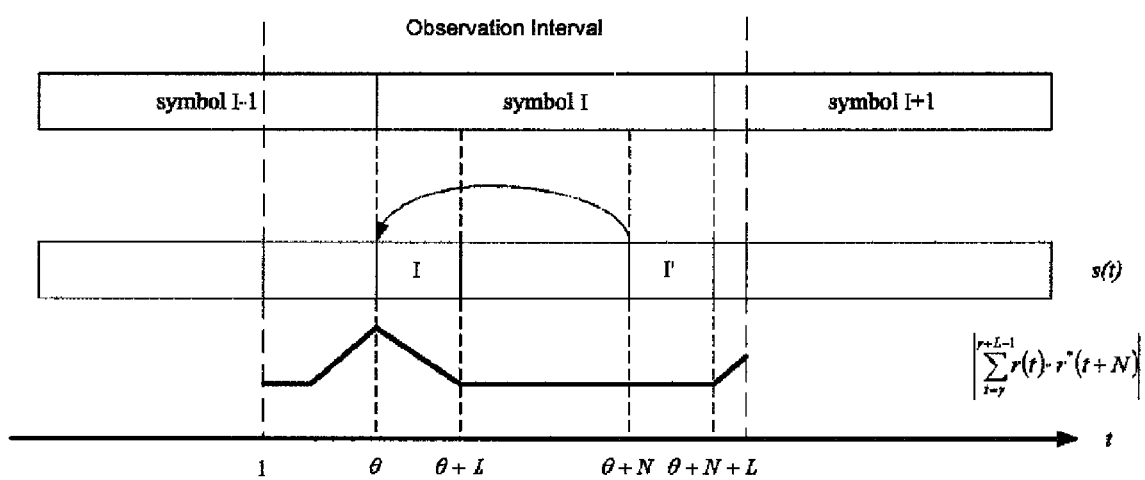
FIG. 2 schematic illustration of an OFDM symbol and GI with a corresponding autocorrelation plot.
Figure 3:
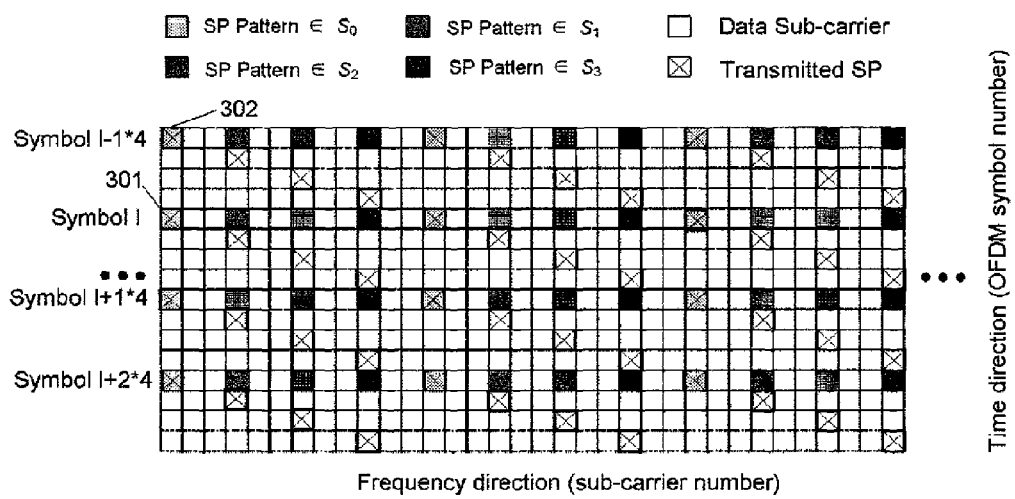
FIG. 3 is an illustration of exemplary frame structure of a DVB-T system.
Figure 4:
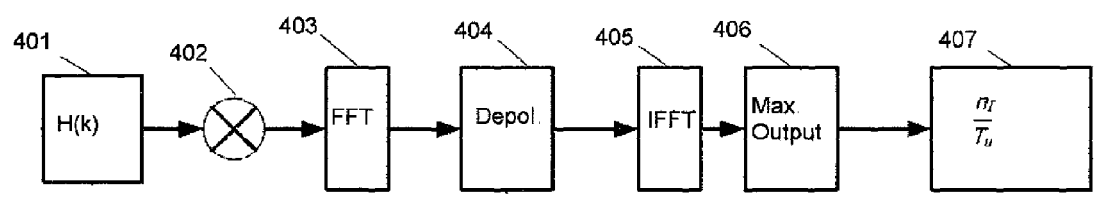
FIG. 4 is a schematic illustration of the functional blocks of an OFDM receiver configured to determine the integer frequency offset; according to the invention.

Turning now to FIG. 4, the functional blocks of an OFDM receiver embodying features of this disclosure are shown schematically. The OFDM symbols 401 are transmitted over a fading channel, $H_k$. As discussed above, this channel is subject to frequency offset comprising an integer portion and a fractional portion as follows:

$$\Delta f = n_I \frac{1}{T_u} + \Delta f'_F \cdot \frac{1}{T_u} \quad (11)$$

The fractional frequency offset can be determined using conventional methods and compensated for by a mixer in block 402 In block 403, the Ith received symbol is demodulated by the FFT routine, resulting in $$z_{l,k} = H_{l,k'} \cdot e^{j2\pi((l(N+L)+L)/N)n_I} \cdot \begin{cases} b_{l,k'} & k \in S_{mod(l,4)} + n_I \\ a_{l,k'} & k \in H + n_I \\ 0 & \text{otherwise} \end{cases} + n_{l,k} \quad (12)$$

Next, the output from block 403 is depolarized by known pattern $b_k$ in block 404. Each of the four possible SP patterns, $S_0, S_1, S_2, S_3$, is checked for the spectral shift m, $\forall m \in \{-N_{max}, N_{max}\}$ because the symbol index p=mod(l,4) is unknown. Accordingly, the depolarized samples $v_{p,m,d}$ are $$v_{p,m,d} = z_{l,k} \cdot b^*_k \quad (13)$$

where $k = S_{mod(p+d,4)} + m$, $\forall p \in \{0,1,2,3\}$
Therefore, $$v_{p,m,d} = e^{j2\pi(l(N+L)/N)n_I} \cdot H_{l,k'} \cdot \begin{cases} \beta^2 & k \in S_{mod(l,4)} + n_I \\ a_{l,k'} b^*_k & \text{otherwise} \end{cases} + \text{noise} \quad (14)$$

The depolarized samples $v_{p,m,d}$ are next run through an IFFT routine in block 405. If $k \in S_{mod(l,4)} + n_I$, then the IFFT output from block 405 of depolarized samples $v_{p,m,d}$ will correspond to the channel impulse response h[t] while the others will yield white noise. Accordingly, depolarized samples $v_{p,m,d}, \forall p \in \{0,1,2,3\}, m \in \Gamma$ are fed through IFFT and a maximum value $w_{p,m,d}$ of the output is recorded:

$$w_{p,m,d} = \max(|IFFT\{v_{p,m,d}\}|) \quad (15)$$
$$\forall p \in \{0, 1, 2, 3\}, m \in \Gamma$$

where $$IFFT\{v_{p,m,d}\} = \quad (16)$$
$$\begin{cases} \beta^2 IFFT\{H_{lk}\} = \beta^2 h[t] & k \in S_{mod(l,4)} + n_I \\ IFFT\{H_{l,k} a_{l,k} b^*_k\} = \text{white noise} & \text{otherwise} \end{cases}$$

as referenced above.

In block 406, the output $w_{p,m,d}$ is accumulated for a sufficient sequence of symbols. Because the SP patterns repeat every four OFDM symbols, it is preferable to accumulate at a rate other than every four symbols in order to minimize the effects of deeply fading sub-carriers. In one embodiment shown in FIG. 5, $w_{p,m,d}$ is accumulated at a rate of every five OFDM symbols. As can be seen, the four possible SP patterns are indicated by $S_{0,0}, S_{1,0}, S_{2,0}$, and $S_{3,0}$. Further, the set of spectral shifts in the range of −1 to 1 are shown for the first SP pattern by $S_{0,-1}, S_{0,0}$ and $S_{0,1}$.

Finally, in block 407 the integer portion of the frequency offset is determined using the maximum values from the IFFT output. Specifically, the spectral shift $\hat{n}_I$ and symbol index $\hat{p}$ are estimated as follows:

$$\{\hat{n}_I, \hat{p}\} = \arg\max_{\substack{m \in \Gamma' \\ p \in \{0,1,2,3\}}} \sum_{d=\{0,5,10,\ldots\}} w_{p,m,d} \quad (17)$$

Figure 5:
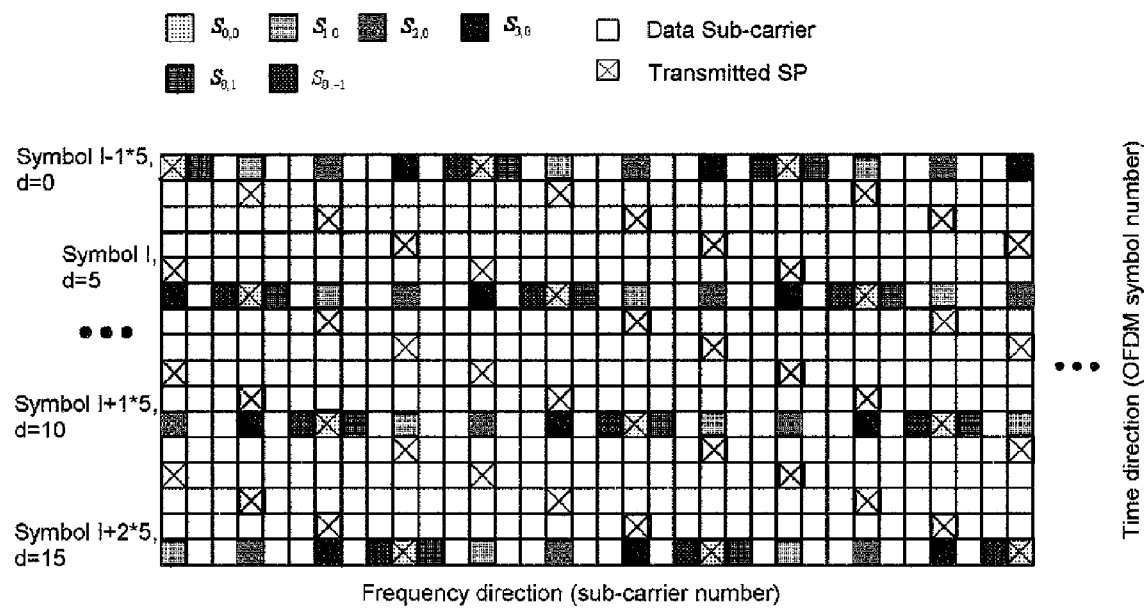
FIG. 5 is an illustration of exemplary frame structure of a DVB-T system showing signal accumulation over a period of five OFDM symbols; according to the invention

Thus, in the example shown in FIG. 5, the possible SP patterns and spectral shifts are illustrated. Correlation with the channel impulse response is maximized at the locations where the transmitted SPs occur, indicating that the symbol index corresponds to SP pattern $S_0$ and a spectral shift of 0. By accumulating the IFFT output over a period of time, at d=0, 5, 10, 15, the spectral shift and symbol index that maximize correlation with the channel impulse response can quickly be identified.

Described herein are presently preferred embodiments, however, one skilled in the art that pertains to the present invention will understand that the principles of this disclosure can be extended easily with appropriate modifications to other applications. For example, embodiments above have been described with regard to specific scattered pilot implementations. Appropriate modifications can readily be made to the systems and methods disclosed to accommodate other scattered pilot schemes.

Also, examples have been given regarding use with the mobile television standards ISDB-T and DVB-T, although the principles can be applied to a wide range of OFDM wireless communication employing scattered pilots. As such, changes and modifications are properly, equitably, and intended to be, within the full range of equivalence of the following claims.

What is claimed is:

1. A method for determining frequency offset in an Orthogonal Frequency Division Multiplexing (OFDM) multiple sub-carrier digital communication receiver comprising the steps of:
   receiving a plurality of modulated symbols over a channel having a channel impulse response, wherein the received symbols are periodically transmitted known signals;
   demodulating the received symbols;
   depolarizing the demodulated symbols;
   correlating an inverse Fourier transform of the depolarized symbols with the channel impulse response by maximizing the inverse Fourier transform of the depolarized symbols at different symbol transmission patterns; and
   determining an integer portion of the frequency offset from the correlation of the inverse Fourier transform of the depolarized symbols with the channel impulse response.

2. The method of claim 1, further comprising the step of determining a symbol index of the received symbols from the correlation of the inverse Fourier transform output with the channel impulse response.

3. The method of claim 1, wherein the plurality of modulated symbols comprises scattered pilot values.

4. The method of claim 3, wherein the step of depolarizing the demodulated symbols comprises depolarizing the demodulated symbols by a pattern corresponding to the scattered pilot values.

5. The method of claim 4, wherein the step of correlating the inverse Fourier transform with the channel impulse response comprises performing the inverse Fourier transform on the depolarized symbols at a set of symbol indices corresponding to possible scattered pilot patterns.

6. The method of claim 5, wherein the scattered pilot values are transmitted every twelfth sub-carrier and wherein the possible scattered pilot patterns comprises four patterns.

7. The method of claim 5, wherein the step of correlating the inverse Fourier transform with the channel impulse response comprises performing the inverse Fourier transform on the depolarized symbols at a set of possible spectral shifts.

8. The method of claim 3, further comprising the step of accumulating the inverse Fourier transform of the depolarized symbols at a first frequency of the received symbols.

9. The method of claim 8, wherein the first frequency of the received symbols does not equal a frequency at which the scattered pilots repeat.

10. The method of claim 8, wherein the first frequency of the received symbols comprises every five symbols and wherein the scattered pilots are spaced every twelfth sub-carrier and repeat every four symbols.

11. An apparatus in an Orthogonal Frequency Division Multiplexing (OFDM) multiple sub-carrier digital communication receiver for determining a frequency offset of a symbol transmitted over a channel having a channel impulse response, comprising a demodulator block configured to demodulate received symbols, wherein the received symbols are periodically transmitted known symbols, a depolarizing block configured to depolarize the demodulated symbols and a correlation block configured to correlate an inverse transform of the depolarized symbols with the channel impulse response, wherein the apparatus is configured to determine an integer portion of the frequency offset a correlation of an inverse Fourier transform of the depolarized symbols with the channel impulse response by maximizing the inverse Fourier transform of the depolarized symbols at different symbol transmission patterns.

12. The apparatus of claim 11, wherein the apparatus is further configured to determine a symbol index of the received symbols from the correlation of the inverse Fourier transform output with the channel response.

13. The apparatus of claim 11, wherein the plurality of modulated symbols comprises scattered pilot values.

14. The apparatus of claim 13, wherein the depolarizing block is configured to depolarize the demodulated symbols by a pattern corresponding to the scattered pilot values.

15. The apparatus of claim 14, wherein the correlation block is configured to perform the inverse Fourier transform on the depolarized symbols at a set of symbol indices corresponding to possible scattered pilot patterns.

16. The apparatus of claim 15, wherein the scattered pilot values are transmitted every twelfth sub-carrier and wherein the possible scattered pilot patterns comprises four patterns.

17. The apparatus of claim 15, wherein the correlation block is further configured to perform the inverse Fourier transform on the depolarized symbols at a set of possible spectral shifts.

18. The apparatus of claim 13, wherein the apparatus is further configured to accumulate the inverse Fourier transform of the depolarized symbols at a first frequency of the received symbols.

19. The apparatus of claim 18, wherein the first frequency of the received symbols does not equal a frequency at which the scattered pilots repeat.

20. The apparatus of claim 18, wherein the first frequency of the received symbols comprises every five symbols and wherein the scattered pilots are spaced every twelfth sub-carrier and repeat every four symbols.

* * * * *